United States Patent [19]

Constancio

[11] Patent Number: 5,172,985
[45] Date of Patent: Dec. 22, 1992

[54] MULTIDIRECTIONAL PROPELLER SHAFT BEARING

[75] Inventor: Silvio J. C. Constancio, São Paulo, Brazil

[73] Assignee: Industria E Commercio de Auto Pecas Rei Ltda, São Paulo, Brazil

[21] Appl. No.: 816,738

[22] Filed: Jan. 3, 1992

[30] Foreign Application Priority Data

Jan. 3, 1991 [BR] Brazil .................................. 7100032

[51] Int. Cl.⁵ ............................................. F16C 27/06
[52] U.S. Cl. ..................................... 384/536; 384/582
[58] Field of Search ............... 384/535, 536, 537, 542, 384/581, 582

[56] References Cited

U.S. PATENT DOCUMENTS

| | | | |
|---|---|---|---|
| 2,162,159 | 6/1939 | Cole | 384/536 |
| 2,414,335 | 1/1947 | Schroeder | 384/536 |
| 2,857,974 | 10/1958 | Heller | 384/536 X |
| 3,639,015 | 2/1972 | Maas | 384/536 |
| 3,961,829 | 6/1976 | Bowen | 384/536 |
| 4,571,098 | 2/1986 | Rudnik | 384/536 X |

Primary Examiner—Thomas R. Hannon
Attorney, Agent, or Firm—Beveridge, DeGrandi & Weilacher

[57] ABSTRACT

A multidirectional propeller shaft bearing is disclosed which includes a body made of two die-stamped plates, the first being provided with a cylindrical box having an anchoring flange on one side and the opposite side has an attached, welded and equally shaped other flange made by the plate itself. In addition, within the cylindrical part, an equally cylindrical rubber part is housed, the inside diameter of which includes a core of harder material which is provided with a grease nipple. The core of harder material provides an inner housing for a conventional bearing so that any type of propeller shaft may be accurately passed therethrough, with multidirectional springiness being provided by the rubber part whose outside diameter forms a flange or collar shaped so as to fit closely against the anchoring flange and so that it may be affixed thereto by means of an equally shaped, die-stamped plate, attached by means of nuts and bolts, in an arrangement that resembles a sandwich. The anchoring flange and rear die-stamped plate are solidly interconnected to one another by means of side blocks which are provided with threaded holes so that this assembly may be secured under a bent sheet-metal bracket whose lateral rims are provided with slots and holes for attaching and adjusting the bearing.

1 Claim, 2 Drawing Sheets

MULTIDIRECTIONAL PROPELLER SHAFT BEARING

BACKGROUND OF THE INVENTION

This application relates to a multidirectional propeller shaft bearing. More specifically, the application relates to technical and functional improvements especially developed in view of the design of a new constructive arrangement in a multidirectional device which may be used to support a propeller shaft.

As is known to those skilled in the art, various models of heavy-duty vehicles are available today, such as trucks, tractor-trailer rigs, buses, farm machines, military vehicles and/or others, which vehicles are equipped with a propeller shaft of considerable length that provides a revolving transmission system between the engine (gearbox) and the final drive. This propeller shaft, due to its extended length, requires that an intermediate support be provided. On a factor-built chassis, this intermediate support is a simple plate or vertical structure on which a ball bearing is mounted and through which the propeller shaft is passed, so as to provide suitable support for the assembly. However, this type of support lacks any type of play or springiness and, consequently, it lacks any freedom to move from one side to another when subject to vibrations due to the vehicle's operation. Obviously, these vibrations, though small, are transmitted to the remainder of the vehicle. The vibrations also produce premature fatigue of the propeller shaft support, mostly affecting the bearing.

A number of devices have been presented to correct this problem. One such device is the one described in Patent BR No. 87,242 (dated Jan. 19, 1966), which provides an improved bushing for the propeller shaft's suspension mountings, in which three plastic rims, concentric with the ball bearing, enable low-amplitude propeller-shaft vibrations to be taken up while the vehicle is being driven. Vibrations at higher amplitudes, however, continued to produce the undesirable effects.

A further solution was also proposed in Invention Patent PI No. 8,801,336, under the title "MULTIDIRECTIONAL PROPELLER-SHAFT SUSPENSION", in which the problem was corrected completely. However, this correction was accomplished by the use of a mechanical arrangement which is now regarded as obsolete and of substantially complicated industrial feasibility.

SUMMARY OF THE INVENTION

In view of the aforementioned circumstances and for the purpose of overcoming the deficiencies noted above, the present multidirectional propeller shaft bearing was developed. The multidirectional propeller shaft bearing in accordance with this invention includes a new constructive arrangement which was devised to provide an extremely simple design, having the desired operating performance and the ability to be adopted by various models of heavy-duty vehicles. It was a further objective of this invention to provide the multidirectional propeller shaft bearing at a much lower manufacturing cost as compared to conventional devices.

The multidirectional propeller shaft bearing in accordance with the invention includes only two basic parts, namely, a bent sheet-metal bracket and the bearing itself. The bracket is provided with a suitable upper means for easily securing it to the vehicle and with a lower means so that the bearing can be adjustably attached and able to fit various types of vehicles.

Furthermore, the bearing in accordance with the invention is provided with an intermediate rubber damper by which the propeller shaft's support bearing is housed, and with a grease nipple included therein. This provides a rugged device which is able to deaden any possible vibration or oscillation to the fullest extent.

BRIEF DESCRIPTION OF THE DRAWINGS

For a better understanding of the present invention, a detailed description thereof will now be provided, with reference to the attached drawings, wherein.

DETAILED DESCRIPTION OF THE INVENTION

Figure 1:
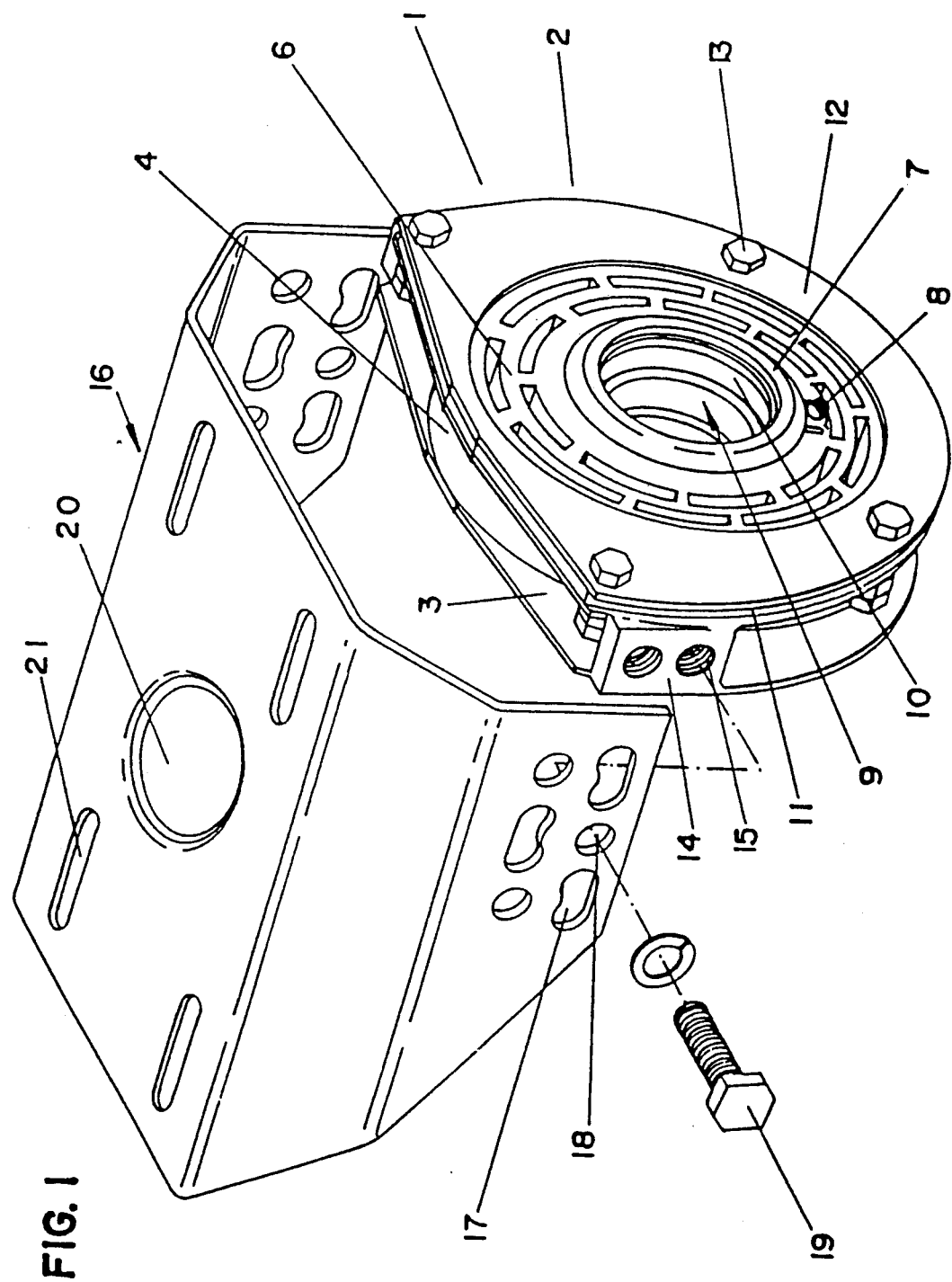
FIG. 1 is a perspective view of a multidirectional propeller shaft bearing from a fore upper angle.
Figure 2:
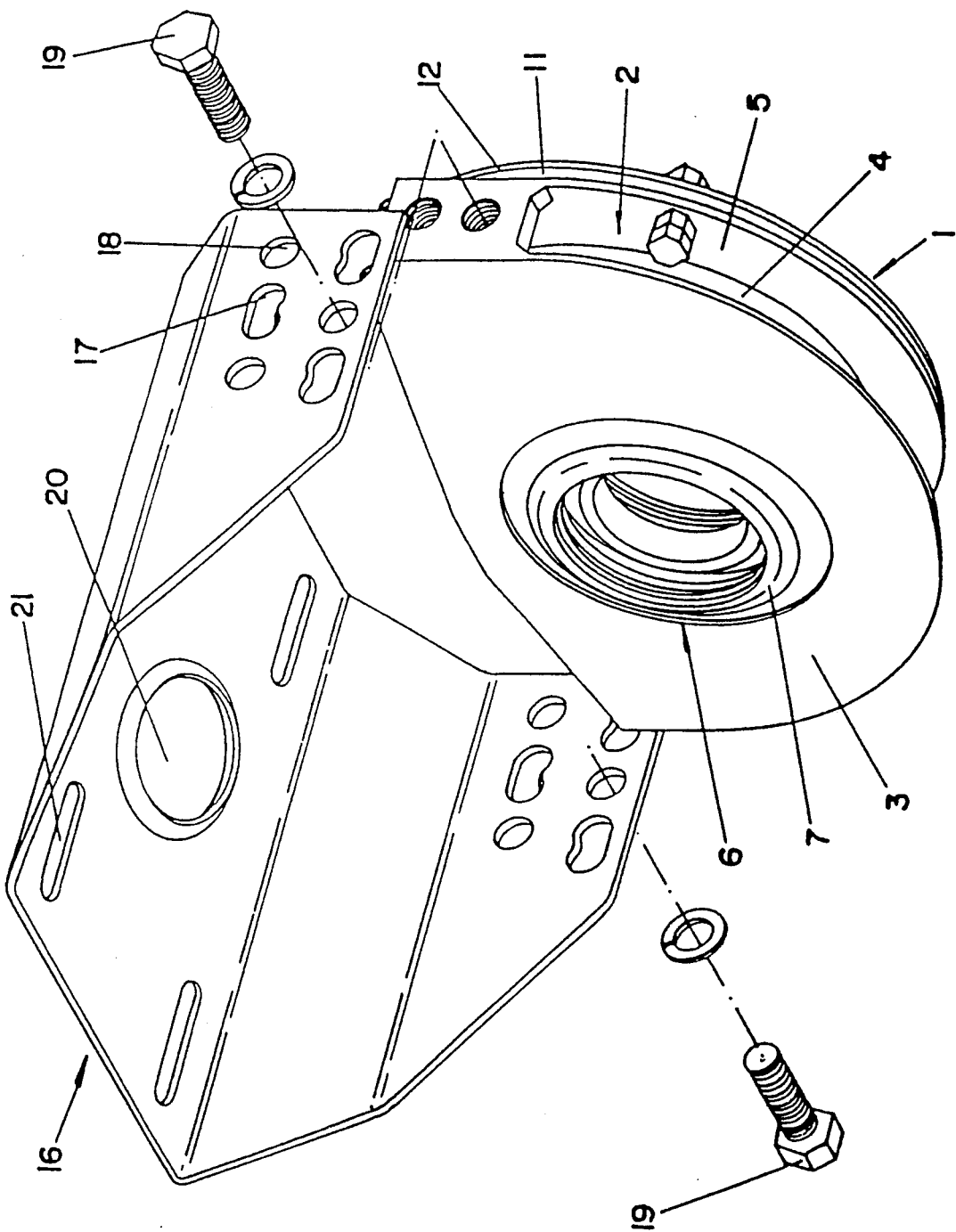
FIG. 2 is a further perspective view of a multidirectional propeller shaft bearing from an aft lower angle.

According to the included illustrations and the following detailed description thereof, the present multidirectional propeller shaft bearing includes a virtually crescent-shaped body 1 obtained from two die-stamped plates, namely, a fore die-stamped plate 2 and an aft die-stamped plate 3. The fore die-stamped plate 2 is provided with a portion in the shape of a liner or cylindrical box 4, the fore end of which is outwardly bent to thereby provide an anchoring flange 5, while the aft end thereof has an attached, welded and equally shaped other flange made up by the aft die-stamped plate 3 itself. In addition, within the cylindrical part 4, a virtually ring-shaped, equally cylindrical rubber part 6 is housed, whose inside diameter is made up of a core of harder material 7, which, in turn, is provided with grease nipple 8. The core material 7 further provides an inner housing 9 for a conventional bearing so that any type of propeller shaft may be accurately passed therethrough. The multidirectional springiness is provided by the rubber part 6, whose outside diameter forms a flange or collar 11 shaped so as to fit closely against the anchoring flange 5. The flange 11 is shaped so that it may be affixed to the anchoring flange 5 by means of an equally shaped, die-stamped plate 12, attached by means of nuts and bolts 13 in an arrangement that resembles a sandwich.

The anchoring flange 5 and rear die-stamped plate 3 are solidly interconnected to one another by means of rectangular side blocks 14, which are closely fitted between these parts and are adjusted in a vertical and parallel direction. Both of the rectangular side blocks 14 are likewise provided with threaded holes 15 so that this assembly may be secured under a bent sheet metal bracket 16 which resembles the shape of an inverted "U". The lateral rims of the sheet metal bracket 16 are provided with slots 17 and holes 18 whereby the actual bearing may be attached by means of bolts 19 and adjusted according to each type of vehicle. The same adjustment also is enabled at the upper part of the bracket 16, where the bracket 16 is likewise provided with a large central opening 20 and lengthwise slots 21, which make up the adjustable means for the assembly to be suitably affixed to the vehicle.

What is claimed is:

1. A multidirectional propeller shaft bearing, comprising: an essentially crescent-shaped body, said body obtained from a fore die-stamped plate and an aft die-stamped plate, the fore die-stamped plate being provided with a portion in the shape of a liner or cylindrical box, a fore end of said liner or cylindrical box being outwardly bent to thereby provide an anchoring flange while an aft end of said liner or cylindrical box has an attached, welded and equally shaped other flange made up by the aft die-stamped plate, wherein said liner or cylindrical box houses a virtually ring-shaped, equally cylindrical rubber part whose inside diameter includes a core of harder material, said core being provided with a grease nipple, wherein said core defines an inner housing for a conventional bearing so that any type of propeller shaft may be accurately passed therethrough, said rubber part providing multidirectional springiness, wherein an outside diameter of said rubber part forms a flange or collar shaped so as to fit closely against the anchoring flange and so that it may be affixed thereto by an equally shaped, die-stamped plate, attached by nuts and bolts, in sandwich type arrangement; the anchoring flange and the aft-die stamped plate being solidly interconnected to one another by rectangular side blocks, said side blocks closely fitted between said anchoring flange and said aft die-stamped plate and adjustable in a vertical and parallel direction, said side blocks being provided with threaded holes so that the bearing may be secured under a bent sheet-metal bracket, the bracket resembling the shape of an inverted "U" whose lateral rims are provided with slots and holes, whereby the bearing may be attached by means of bolts and adjusted according to each type of vehicle, with an adjustment being enabled at an upper part of the bracket where the bracket is provided with a large central opening and lengthwise slots, which provide an adjustable means for the bearing to be affixed to the vehicle.

* * * * *